(12) United States Patent
Sahai et al.

(10) Patent No.: US 10,667,540 B2
(45) Date of Patent: Jun. 2, 2020

(54) SELF-FOAMING READY TO DRINK BEVERAGES

(71) Applicants: NESTEC S.A., Vevey (CH); Deepak Sahai, Dublin, OH (US); Alexander Sher, Dublin, OH (US)

(72) Inventors: Deepak Sahai, Dublin, OH (US); Alexander Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 727 days.

(21) Appl. No.: 14/905,142

(22) PCT Filed: Jul. 15, 2013

(86) PCT No.: PCT/US2013/050440
§ 371 (c)(1),
(2) Date: Jan. 14, 2016

(87) PCT Pub. No.: WO2015/009269
PCT Pub. Date: Jan. 22, 2015

(65) Prior Publication Data
US 2016/0157506 A1 Jun. 9, 2016

(51) Int. Cl.
*A23F 3/16* (2006.01)
*A23L 2/56* (2006.01)
(Continued)

(52) U.S. Cl.
CPC .......... *A23F 3/163* (2013.01); *A23F 3/30* (2013.01); *A23F 5/243* (2013.01); *A23F 5/36* (2013.01); *A23L 2/40* (2013.01); *A23L 2/56* (2013.01); *B01F 3/04446* (2013.01); *B01F 15/0087* (2013.01); *B65D 1/04* (2013.01);
(Continued)

(58) Field of Classification Search
None
See application file for complete search history.

(56) References Cited

U.S. PATENT DOCUMENTS 4,221,291 A 9/1980 Hunt
4,524,078 A 6/1985 Bardsley et al.
(Continued)

FOREIGN PATENT DOCUMENTS

AU A 12758/88 * 6/1988
EP 1486432 12/2004
(Continued)

*Primary Examiner* — Tamra L. Dicus
(74) *Attorney, Agent, or Firm* — K&L Gates LLP

(57) ABSTRACT

A container stores a main liquid component that contains a dissolved gas, preferably nitrous oxide, separately from a foam initiator component that is at least one of a powder, a liquid or a concentrate. A dispensing part of the container, such as a dispensing lid, can contain the foam initiator component. The foam initiator component is dispersed and dissolved into the main liquid component to form a foaming ready to drink beverage. The foam initiator component comprises a portion of the ingredients of the ready to drink beverage. Combination of the foam initiator component with the main liquid component not only results in foam generation in the container without any mechanical energy input additional to the opening of the container but also forms the ready to drink beverage.

10 Claims, 1 Drawing Sheet

(51) Int. Cl.
*A23F 3/30* (2006.01)
*A23F 5/24* (2006.01)
*A23F 5/36* (2006.01)
*B65D 1/04* (2006.01)
*A23L 2/40* (2006.01)
*B65D 81/34* (2006.01)
*B01F 3/04* (2006.01)
*B01F 15/00* (2006.01)

(52) U.S. Cl.
CPC .......... *B65D 81/34* (2013.01); *A23V 2002/00* (2013.01); *B01F 2215/0022* (2013.01)

(56) References Cited

U.S. PATENT DOCUMENTS

| | | | |
|---|---|---|---|
| 5,290,574 | A | 3/1994 | Jamieson et al. |
| 7,077,291 | B1 | 7/2006 | Bell et al. |
| 2003/0148003 | A1 | 8/2003 | Wright |
| 2006/0040023 | A1 | 2/2006 | Zeller et al. |
| 2006/0040038 | A1 | 2/2006 | Zeller et al. |
| 2007/0031545 | A1 | 2/2007 | Ejisackers et al. |
| 2009/0277928 | A1 | 11/2009 | Bruckner |
| 2010/0009052 | A1 | 1/2010 | Canessa et al. |
| 2010/0055245 | A1* | 3/2010 | Havekotte ................ A23L 2/00 426/66 |
| 2010/0215818 | A1 | 8/2010 | Kessler et al. |
| 2011/0155732 | A1* | 6/2011 | Sprunger ................ A23F 5/46 220/212 |
| 2015/0284150 | A1* | 10/2015 | Doubles ................ B65D 41/26 222/1 |

FOREIGN PATENT DOCUMENTS

| | | |
|---|---|---|
| EP | 1668992 | 6/2006 |
| GB | 2487895 | 8/2012 |
| WO | 9107326 | 5/1991 |
| WO | 9416967 | 8/1994 |
| WO | 9532130 | 11/1995 |
| WO | 9856678 | 12/1998 |
| WO | 2006099636 | 9/2006 |
| WO | 2012076578 | 6/2012 |
| WO | 2012117281 | 9/2012 |

\* cited by examiner

SELF-FOAMING READY TO DRINK BEVERAGES

CROSS REFERENCE TO RELATED APPLICATIONS

The present application is a National Stage of International Application No. PCT/US2013/050440, filed on Jul. 15, 2013, the entire contents of which are being incorporated herein by reference.

BACKGROUND

The present disclosure generally relates to food and beverage products. More specifically, the present disclosure relates to self-foaming ready to drink ("RTD") beverages formed by a main liquid component and a foam initiator component and also relates to methods for making same and containers that form and contain same.

Foam is considered a highly desirable attribute for beverages such as espresso coffees or for cappuccino- or frappe-style coffee and milk beverages. Consumers drinking foamed beverages enjoy the additional aesthetic and taste characteristics that accompany beverages having a foamed topping. However, providing foamed products in a ready-to-drink ("RTD") form, when the beverage is typically sold and consumed in its own container, such as a bottle, a can or the like, is difficult. Foamed beverages such as a cappuccino or frappe for which a consumer can enjoy a nice foam head are typically prepared using a foam-generating apparatus with an external energy input. A foamed RTD beverage with high quality and stable foam that can be consumed from the RTD bottle or a can is not known.

A typical foaming RTD beverage can be like beer, where release of gas while pouring of the beverage generates the foam. Other carbonated RTD beverages can behave similarly when poured into another container; nevertheless, these beverages do not generate a foam head while in the RTD container. Another approach to make a foamed RTD beverage that can be enjoyed from its container would involve shaking the container to form a foam head. However, the amount of foam generated with this approach is dependent on the extent of shaking and may not be a preferred option for most consumers.

SUMMARY

The present disclosure provides self-foaming ready-to-drink foaming beverages and also provides methods for making same and containers that form and contain same. The beverage can be a foamed beverage such as a cocoa malt, a coffee, a cappuccino, a latte, a macchiato, an espresso, a foamed chocolate milk, a foamed tea, a foamed fruit drink or another type of foamed beverage.

In a general embodiment, a container is provided. The container includes: a foaming initiator component comprising a medium that is a powder or a liquid; and a main liquid component comprising dissolved gas and stored in the container separately from the foaming initiator component, the container configured to dispense the foaming initiator component into the main liquid component upon opening of the container, and dispensation of the foaming initiator component into the main liquid component forms a foaming ready to drink beverage in the container.

In a related embodiment, the container includes a dispensing part that stores and dispenses the foaming initiator component. The dispensing part can be a lid of the container.

In a related embodiment, the main liquid component includes water in which a gas selected from the group consisting of nitrous oxide ($N_2O$), carbon dioxide ($CO_2$) and a combination thereof is dissolved.

In a related embodiment, the main liquid component includes at least one of sugar, a sweetener or a flavor.

In a related embodiment, the foaming initiator component includes a coffee ingredient that is a soluble coffee powder or a coffee concentrate. The main liquid component can include coffee aroma.

In a related embodiment, the foaming initiator component comprises a tea ingredient that is a soluble tea powder or a tea concentrate. The main liquid component can include tea aroma.

In a related embodiment, the foaming initiator component includes a fruit ingredient that is a fruit powder or a fruit concentrate.

In a related embodiment, the foaming initiator component includes a vegetable ingredient that is a vegetable powder or a vegetable concentrate.

In a related embodiment, the foaming initiator component includes a dairy ingredient selected from the group consisting of a dairy powder, a dairy concentrate, and a combination thereof.

In a related embodiment, the foaming initiator component includes a non-dairy ingredient that is a non-dairy powder or a non-dairy concentrate.

In a related embodiment, the foaming initiator component includes a cocoa ingredient selected from the group consisting of a cocoa powder or a cocoa concentrate.

In a related embodiment, the foaming initiator component includes a sugar or sweetener ingredient that is a sugar or sweetener powder or a sugar or sweetener concentrate.

In a related embodiment, the foaming initiator component includes a mixture of ingredients that is a mixture of powders or a mixture of concentrates.

In another embodiment, a method of making a foaming ready to drink beverage is provided. The method includes: storing a main liquid component and a foaming initiator component in a beverage container, the main liquid component comprising dissolved gas; and storing the foaming initiator component separately from the main liquid component, the foaming initiator component comprising a medium that is a powder or a liquid, the foaming initiator component stored in a dispensing part of the beverage container that dispenses the foaming initiator component into the main liquid component to produce the foaming ready to drink beverage in the container. The dispensing part of the container can be a lid of the container.

In a related embodiment, the foaming initiator component includes an ingredient selected from the group consisting of coffee solids, tea solids, cocoa solids, fruit flavored solids, coffee concentrate, tea concentrate, cocoa concentrate, fruit concentrate, and combinations thereof.

In a related embodiment, the foaming initiator component includes a portion of the ingredients of the beverage. The main liquid component can include the remaining ingredients of the beverage.

In a related embodiment, the foaming initiator component is stored in multiple compartments.

In another embodiment, a method of forming a foaming ready to drink beverage is provided. The method includes the steps of opening a container comprising a foaming initiator component comprising a medium that is a powder or a liquid, the opening of the container dispensing the foaming initiator component, into a main liquid component comprising dissolved gas and stored separately from the foam initiator component in the container, to form the foaming ready to drink beverage in the container.

In a related embodiment, the foaming ready to drink beverage is formed without shaking the container or pouring the beverage into a different container.

In another embodiment, a foaming ready to drink beverage is provided. The beverage is formed by dispensation of a foaming initiator component from a dispensing part of a container into a main liquid component comprising dissolved gas and stored in the container separately from the foaming initiator component, the foaming initiator component comprising a medium selected from the group consisting of a powder and a liquid and comprising an ingredient selected from the group consisting of coffee solids, tea solids, cocoa solids, fruit flavored solids, coffee concentrate, tea concentrate, cocoa concentrate, fruit concentrate, and combinations thereof. The dispensing part of the container can be a lid of the container.

An advantage of the present disclosure is to provide a self-foaming ready to drink beverage.

Another advantage of the present disclosure is to allow a consumer to enjoy a foamed RTD beverage from the beverage container by simply opening the container, which releases a foam initiator component from a dispensing lid into a main liquid component within the rest of the container.

Still another advantage of the present disclosure is to provide a foamed RTD beverage without any additional effort from the consumer besides opening the container, such as pouring the beverage into another container or shaking the container.

Yet another advantage of the present disclosure is to provide a foamed RTD beverage in which the foam is generated at the time of consumption simply by releasing the foam initiator component into the main liquid component comprising a dissolved gas such as $N_2O$ and/or $CO_2$.

Another advantage of the present disclosure is to provide a self-foaming RTD beverage in which the foam initiator component includes a portion of the ingredients of the beverage.

Still another advantage of the present disclosure is to store coffee or tea solids or liquid concentrates separately from the aroma to preserve beverage quality.

Yet another advantage of the present disclosure is to stabilize coffee or tea aroma at low concentrations.

Another advantage of the present disclosure is to provide a self-foaming RTD beverage that includes an ingredient with a nutritional benefit that requires separate storage to maintain functionality.

Additional features and advantages are described herein, and will be apparent from, the following Detailed Description.

DETAILED DESCRIPTION

All percentages expressed herein are by weight of the total weight of the composition unless expressed otherwise. When reference is made to the pH, values correspond to pH measured at 25° C. with standard equipment. As used in this disclosure and the appended claims, the singular forms "a," "an" and "the" include plural referents unless the context clearly dictates otherwise. As used herein, "about" is understood to refer to numbers in a range of numerals. Moreover, all numerical ranges herein should be understood to include all integer, whole or fractions, within the range.

As used herein, "comprising," "including" and "containing" are inclusive or open-ended terms that do not exclude additional, unrecited elements or method steps. However, the beverages provided by the present disclosure may lack any element that is not specifically disclosed herein. Thus, any embodiment defined herein using the term "comprising" also includes embodiments "consisting essentially of" and "consisting of" the disclosed components.

Figure 1:
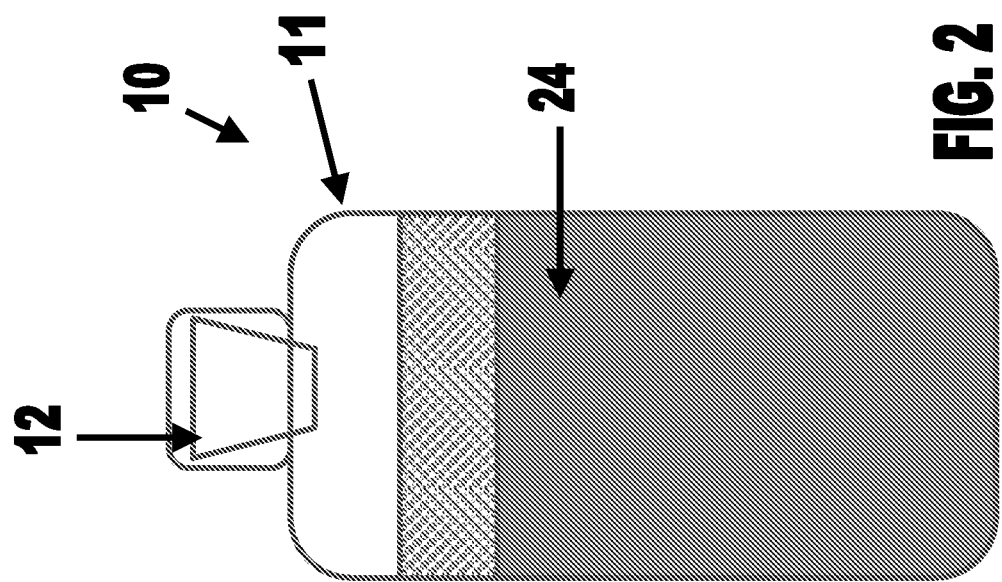
FIGS. 1 and 2 show examples of an embodiment of a container for a self-foaming RTD beverage according to the present disclosure.
Figure 2:
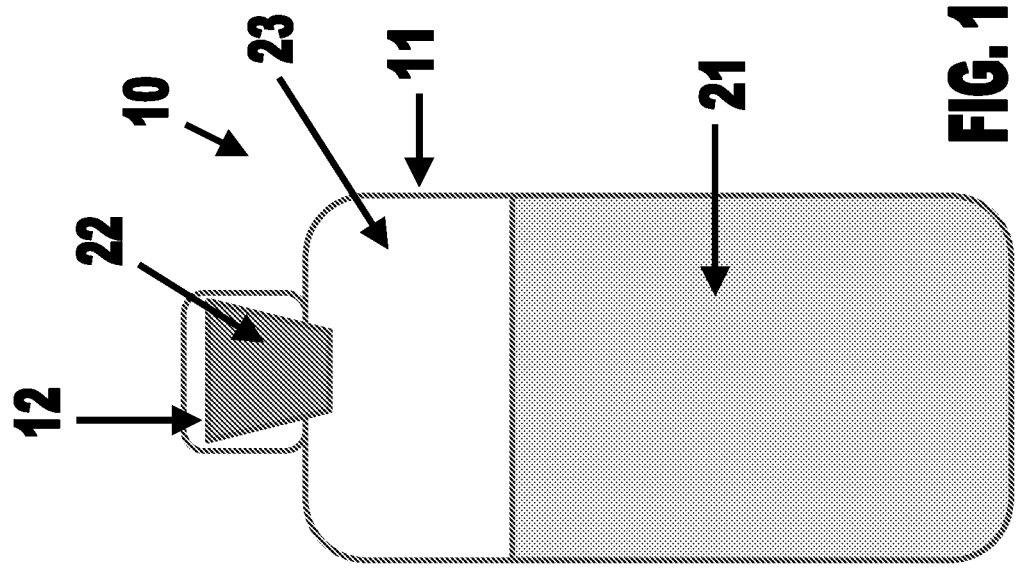

As shown in FIGS. 1 and 2, the present disclosure relates to self-foaming ready to drink ("RTD") beverages formed by a main liquid component 21 and a foam initiator component 22 stored separately within a container 10, such as a bottle made of a thermoplastic polyester, preferably a polyester, such as polyethylene terephthalate ("PET") for example. "Ready-to-drink beverage" means a beverage in liquid form that can be consumed without the further addition of liquid. "Main" in reference to the main liquid component means that the volume of the main liquid component is greater than the volume of the foam initiator component.

The self-foaming RTD beverage can be formed in the container 10. The container preferably contains one or two servings of the RTD beverage, although larger containers can be used. The container preferably has a dispensing part 12, such as a lid, that stores the foam initiator component 22, and the foam initiator component 22 comprises a portion of the ingredients of the RTD beverage. The foam initiator component 22 stored by the dispensing part 12 is preferably in the form of a liquid, a powder and/or a concentrate. Another part 11 of the container 10, such as the container body, can store the main liquid component 21. For foam formation, the main liquid component 21 within the container 10 has dissolved nitrous oxide ($N_2O$), carbon dioxide ($CO_2$) and/or another appropriate gas. The main liquid component 21 can fill the majority of the interior of the container 10, but the volume of the main liquid component 21 in the container 10 allows sufficient space 23 for foam formation.

As generally shown in FIG. 2, when the consumer opens the container 10, a thick foaming beverage 24 is formed by opening the container 10, preferably immediately after the opening of the container 10. The opening of the container 10 mixes the foaming initiator component 22, previously stored in the dispensing part 12, with the main liquid component 21 within the container 10. Such dispensing lids are commercially available and are used to add ingredients into a liquid at the time of consumption. Preferably the foaming is initiated without action by the consumer additional to the opening of the container 10. For example, opening of the container 10 can dispense the foam initiator component 22 from the dispensing part 12 into the gassed liquid to trigger gas release from the main liquid component 21 and resultant foam formation.

Accordingly, the present disclosure provides a solution to make a foamed RTD beverage that comprises (1) a main liquid component that contains a dissolved gas, preferably nitrous oxide, and (2) a foam initiator component that is at least one of a powder, a liquid or a concentrate and is dispersed and dissolved into the main liquid component to form a foaming ready to drink beverage. The foam initiator component can comprise a portion of the ingredients of the ready to drink beverage, and the main liquid component can comprise the remaining ingredients of the ready to drink beverage. The main liquid component comprises a gassed liquid, such as water in which gas such as nitrous oxide ($N_2O$) is dissolved.

The gassing can be performed at any stage of the beverage production process. The gas may be injected into the main liquid component in any suitable way, e.g. by sparging the gas into the main liquid component through a nozzle designed to form small bubbles. In a preferred embodiment, the main liquid component is subjected to pressure during and/or after the injection of the gas, e.g. to a pressure between 1 and 400 bar, preferably between 2 and 50 bar. The pressure may be created by conveying the main liquid component through a high pressure pump, and the gas can be injected into the main liquid component before and/or after the high pressure pump. The gas injection may be performed in a way so that the gas is entirely solubilized in the main liquid component, or the gas may be present in the main liquid component as gas bubbles, e.g. with a size of 1 to 10 microns.

Combination of the foam initiator component with the main liquid component, such as by a storage cap that releases the foam initiator component into the main liquid component, not only results in foam generation without any mechanical energy input (e.g. shaking of bottle or pouring into another container) but also forms the ready to drink beverage. The presence of particles in the foam initiator component, such as particles in a powder or colloidal particles in a liquid or a concentrate, helps the foam formation. For example, the particles can be in a medium that is a powder or a liquid, and the liquid can be a concentrate.

The foaming initiator component can comprise at least one of coffee solids, tea solids, cocoa solids, or fruit flavored solids. In an embodiment, the foaming initiator component comprises coffee solids in a soluble powder or a liquid, and the liquid is preferably a concentrate. In another embodiment, the foaming initiator component comprises a soluble tea powder or a tea concentrate such as any type of tea powder or concentrate. Non-limiting examples of types of tea include green tea, black tea, white tea, oolong tea, rooibos tea, chai tea, flavored tea, herbal tea, fruit tea, and combinations thereof. "Tea" refers to brewable tea and optionally other ingredients in any form such as complete, cut or chiseled leaves; small fragments of leaves; powder; dust; and combinations thereof. The tea can include the tea of a single tea variety or a mixture of one or more tea varieties. The tea can be caffeinated or decaffeinated.

In an embodiment, the foaming initiator component can comprise a cocoa component that can be a powder or a liquid, and the liquid is preferably a concentrate. The cocoa component can include one or more natural cocoas, alkalized cocoas, or other cocoa or chocolate based products. In an embodiment, the foaming initiator component can comprise a fruit component that may include one or more fruit juices, fruit powders, fruit extracts, fruit concentrates, fruit flavor crystals, fruit flavored powders, and the like. The fruit or fruit flavor may be apple, orange, pear, peach, strawberry, banana, cherry, pineapple, kiwi, grape, blueberry, raspberry, mango, guava, cranberry, blackberry or combinations thereof.

In an embodiment, the main liquid component can comprise a dairy component that can include one or more dairy ingredients or dairy substitute ingredients. For example, the dairy ingredients can be milk, milk powder, skim milk, milk proteins and combinations thereof. Examples of suitable dairy proteins are casein, caseinate, casein hydrolysate, whey, whey hydrolysate, whey concentrate, whey isolate, milk protein concentrate, milk protein isolate, and combinations thereof. Furthermore, the dairy protein may be, for example, sweet whey, acid whey, α-lactalbumin, β-lactoglobulin, bovine serum albumin, acid casein, caseinates, α-casein, β-casein and/or γ-casein. Suitable dairy substitute ingredients include soy proteins, rice proteins and combinations thereof, for example.

EXAMPLES

By way of example and not limitation, the following non-limiting examples are illustrative of various embodiments provided by the present disclosure.

Example 1

A self-foaming RTD black coffee can be formed in a container with a dispensing lid. The main liquid component can be water in which nitrous oxide gas is dissolved and can include coffee aroma, and the foam initiator component can be and/or can comprise instant coffee powder or concentrate. The foam initiator component can be stored in the dispensing cap, separately from the main liquid component. At the time of consumption, the coffee powder or concentrate is released into the water from the dispensing cap to form the beverage and initiate foaming.

Example 2

A self-foaming RTD cappuccino-style beverage can be provided. The main liquid component can comprise water, a dairy component such as skim milk and/or caseinates, and coffee aroma. Additionally, other aromas, sweeteners and/or flavorings can be included in the main liquid component as desired. The main liquid component is gassed with nitrous oxide ($N_2O$) gas, another gas or a mixture of gasses to dissolve a sufficient amount of gas for an appropriate foam level. The coffee is stored in the dispensing lid in the form of a concentrate or powder.

At the time of consumption, the consumer opens the dispensing lid that drops the coffee concentrate or powder into the main liquid component. This dispensation triggers release of the dissolved gas in the main liquid component, generating a thick and creamy foam head in the container. The consumer can thus enjoy a foamy RTD cappuccino beverage in the container itself.

Example 3

A RTD cold foaming tea can be provided. The main liquid component can comprise water, a suitable food grade surfactant such as Propylene Glycol Alginate (PGA) and/or another surface active hydrocolloid, and tea aroma. Additionally, other flavorings and sweeteners can be added to the main liquid component. The main liquid component is gassed with nitrous oxide ($N_2O$) gas, another gas or a mixture of gasses. The tea, in the form of a powder or concentrate, can be stored in the dispensing lid. Opening the container dispenses the tea powder or concentrate from the dispensing lid into the main liquid component to trigger release of the dissolved gas and formation of a foam head in the RTD beverage container.

It is well established that storage of coffee or tea solids separately from the aroma is essential to preserve beverage quality. Furthermore, the aroma is significantly more stable at low concentrations. With the self-foaming RTD beverage container disclosed herein, such as in Examples 1-3, the coffee or tea aroma is preferably stored as diluted in the main liquid component to be more stable, and the coffee or tea solids are mixed with the aroma at the time of consumption, thus providing separate storage as well as stabilization of the diluted coffee or tea aroma.

Example 4

The beverage can be a RTD foaming fruit drink and/or a beverage with an ingredient with a nutritional benefit that requires separate storage to maintain functionality. In this case, the main liquid component can comprise water with a suitable food grade surfactant such as PGA. Other flavorings and sweeteners can also be present in the main liquid component. The main liquid component is gassed with nitrous oxide ($N_2O$) gas, another gas or a mixture of gasses. The dispensing lid can store a fruit flavored powder or concentrate and/or an ingredient with a nutritional benefit that requires separate storage to maintain functionality. Opening of the container by the consumer releases the contents of the dispensing lid into the main liquid component to trigger release of the dissolved gas and formation of a foam head in the RTD beverage container. The foamed RTD beverage can now be enjoyed by the consumer from the beverage container itself.

Example 5

A self-foaming RTD cocoa beverage can be provided. The main liquid component is gassed with nitrous oxide ($N_2O$) gas, another gas or a mixture of gasses to dissolve a sufficient amount of gas for an appropriate foam level. The cocoa is stored in the dispensing lid in the form of a concentrate or powder. At the time of consumption, the consumer opens the dispensing lid that distributes the cocoa concentrate or powder into the main liquid component. This dispensation triggers release of the dissolved gas in the main liquid component, generating a thick and creamy foam head in the container. The consumer can thus enjoy a foamy RTD cocoa beverage in the container itself.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of forming a foaming ready to drink beverage, the method comprising opening a container by a consumer at the time of consumption, the container comprising a foaming initiator component comprising a medium selected from the group consisting of a powder and a liquid, the foaming initiator component stored in a dispensing part of the container, the opening of the container dispensing the foaming initiator component, into a main liquid component comprising dissolved gas and stored separately from the foam initiator component in the container, to form the foaming ready to drink beverage in the container.

2. The method of claim 1, wherein the foaming ready to drink beverage is formed without shaking the container or pouring the foaming ready to drink beverage into a different container.

3. A method of making a container for production of a foaming ready to drink beverage, the method comprising:
storing a main liquid component and a foaming initiator component in a beverage container, the main liquid component comprising dissolved gas;
storing the foaming initiator component separately from the main liquid component, the foaming initiator component comprising a medium selected from the group consisting of a powder and a liquid, the foaming initiator component stored in a dispensing part of the beverage container that dispenses the foaming initiator component into the main liquid component to produce the foaming ready to drink beverage in the beverage container; and
providing the container to a consumer while the container still stores the foaming initiator component separately from the main liquid component.

4. The method of claim 3, wherein the foaming initiator component comprises a portion of ingredients of the foaming ready to drink beverage, and the main liquid component comprises the remaining ingredients of the foaming ready to drink beverage.

5. The method of claim 3, further comprising subjecting the main liquid component to a pressure between 1 and 400 bar at a time selected from the group consisting of during gas injection, after gas injection, and a combination thereof.

6. The method of claim 1, wherein the dispensing part is a lid of the container.

7. The method of claim 3, wherein the dispensing part is a lid of the beverage container.

8. The method of claim 1, wherein the main liquid component stored separately from the foam initiator component comprises water in which at least one of nitrous oxide or carbon dioxide is already dissolved.

9. The method of claim 1, wherein the main liquid component stored separately from the foam initiator component comprises coffee aroma.

10. The method of claim 1, wherein the foaming initiator component comprises at least one of soluble coffee powder, a coffee concentrate, a soluble tea powder, a tea concentrate, a fruit powder, a fruit concentrate, a cocoa powder or a cocoa concentrate.

* * * * *